July 4, 1967

E. R. HERD 3,329,322

MATERIAL SPREADER

Filed Dec. 16, 1965

INVENTOR.
ELMER R. HERD

BY *Kimmel, Crowell & Weaver*

ATTORNEYS.

July 4, 1967
E. R. HERD
3,329,322
MATERIAL SPREADER
Filed Dec. 16, 1965
2 Sheets-Sheet 2
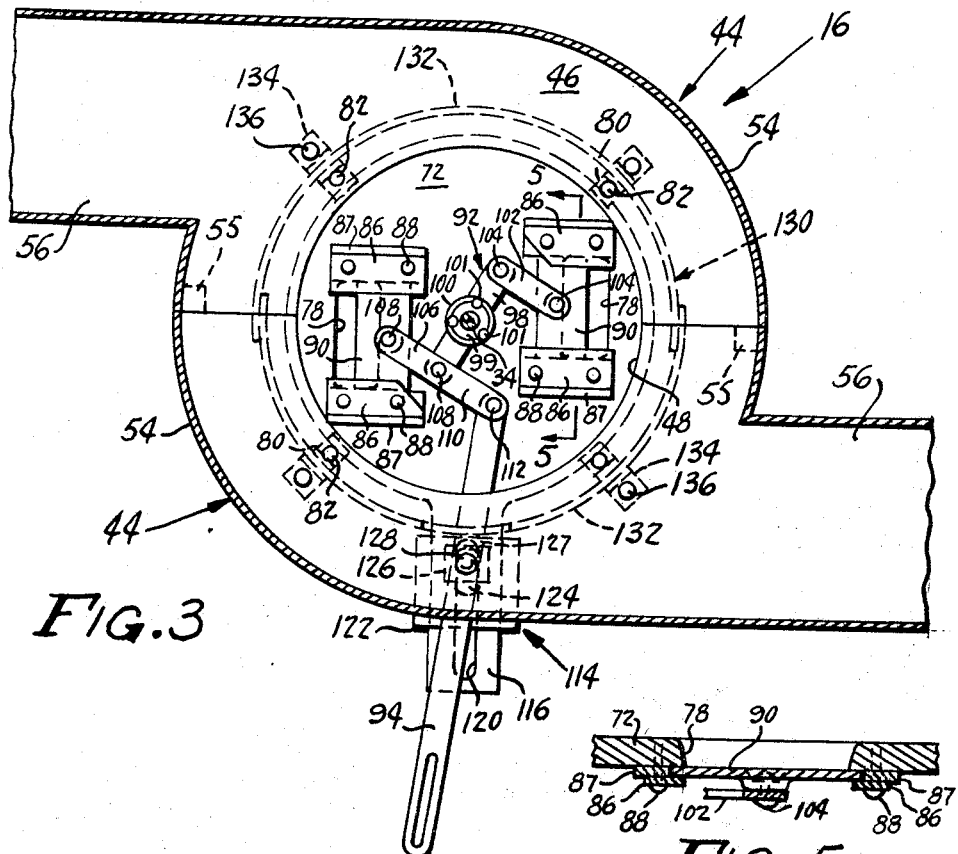
FIG.3
FIG.5
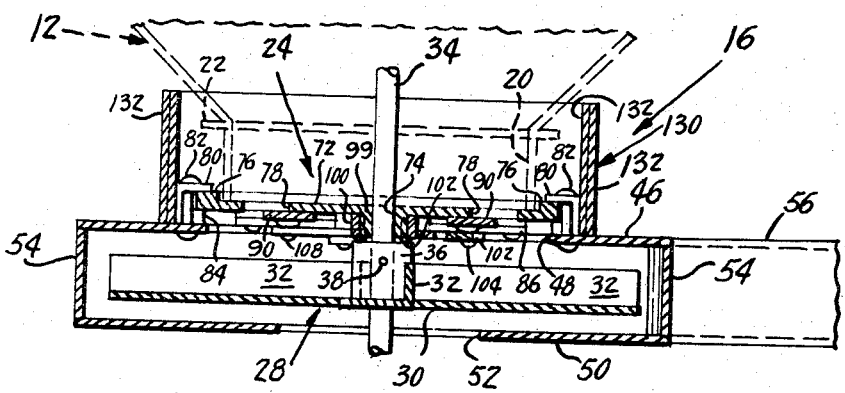
FIG.4
INVENTOR.
ELMER R. HERD
BY *Kimmel, Crowell & Weaver*
ATTORNEYS.

United States Patent Office 3,329,322
Patented July 4, 1967

3,329,322
MATERIAL SPREADER
Elmer R. Herd, Lucerne, Ind., assignor to Herd Seeder Company, Inc., Lucerne, Ind., a corporation of Indiana
Filed Dec. 16, 1965, Ser. No. 514,214
1 Claim. (Cl. 222—485)

ABSTRACT OF THE DISCLOSURE

Broadcasting apparatus for connection to the discharge end of a pulverant material holding gravity feeding hopper and including a fixed aperture disc disposed in the path of material flow and from which is suspended a housing for a rotary disc to receive and spread the material, and valve means selectively operable for sliding movement across the apertures, the valve means being interposed between the housing and the disc.

---

This invention relates to a material spreader of broadcasting unit for seeds, fertilizers, granular chemicals and other pulverant material and is particularly adapted for used in agricultural environments, and constitutes an improvement over my co-pending application Ser. No. 385,-938, filed July 29, 1964, now Patent No. 3,287,021.

Broadcast spreaders are well known in the prior art and generally constitute a hopper positioned above a rotary fan whereby material discharged from the hopper is received by the fan and scattered over an area adjacent the hopper. In general, pulverant material is scattered indiscriminantly about the hopper as it is moved within the area to be treated.

It has been found advantageous to direct the flow of pulverant material laterally of the direction of movement of the hopper, particularly when distributing fertilizer or weed control material in a grove, orchard or other agricultural situation where the plants are of considerable size and separated by a lane or pathway of sufficient size to accommodate a moving vehicle. It will be apparent that the indiscriminant broadcasting of material to the sides and rear of the hopper will result in a considerable wastage of the treatment chemical and in an inefficient use of the material distributed.

It is accordingly an object of the instant invention to provide an improved broadcasting unit constructed and arranged to deliver pulverant material laterally of the hopper.

It is another object of the instant invention to provide a material spreader of the type which may be affixed to a vehicle and which discharges pulverant material on opposite sides thereof.

Still another object of the instant invention is to provide a material spreader having a rotary fan delivering pulverant material to a pair of oppositely extending chutes in order to direct a pulverant material onto a row of trees or plants on each side of a vehicular pathway.

A still further object of the instant invention is the provision of means for simultaneously starting and simultaneously stopping the discharge of pulverant material directed toward each side of a material receiving hopper.

Other objects and advantages of the instant invention, as well as the invention itself, reside in the combinations of elements, arrangement of parts, and feature of construction and operation, all as will be more fully pointed out hereinafter and disclosed in the accompanying drawings wherein there is shown a preferred embodiment of this inventive concept.

In the drawings:
FIGURE 1 is a rear elevational view of the material spreader constructed in accordance with the principles of the instant invention illustrating a pair of oppositely extending material discharge chutes for directing pulverant material on opposite sides thereof, certain parts being broken away for clarity of illustration;

FIGURE 3 is a horizontal cross-sectional view of the material spreader of FIGURE 1 taken substantially along line 3—3 thereof as viewed in the direction of the arrows and illustrating a bottom view of the material flow control means of the instant invention;

FIGURE 4 is a vertical cross-sectional view of the rotary fan of the material spreader of FIGURE 1 as may be seen from along line 4—4 of FIGURE 2 as viewed in the direction of the arrows; and FIGURE 5 is a cross-sectional view of the closure plate of the instant invention taken along line 5—5 of FIGURE 3 viewing in the direction of the arrows.

Figure 1:
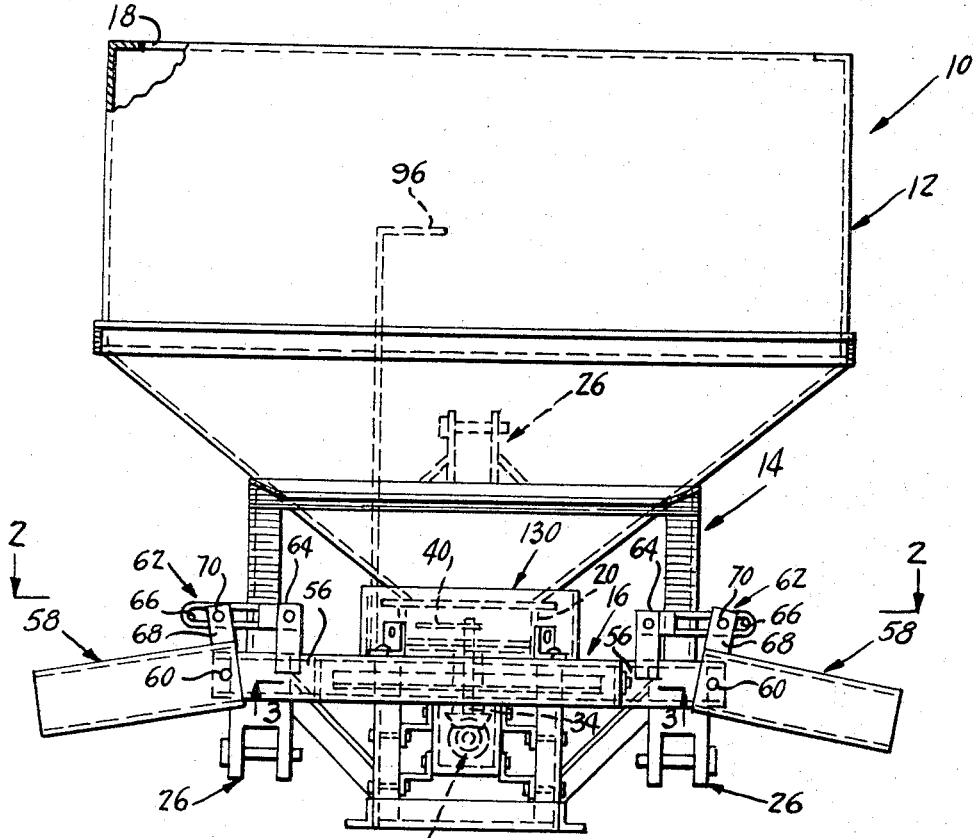
Figure 2:
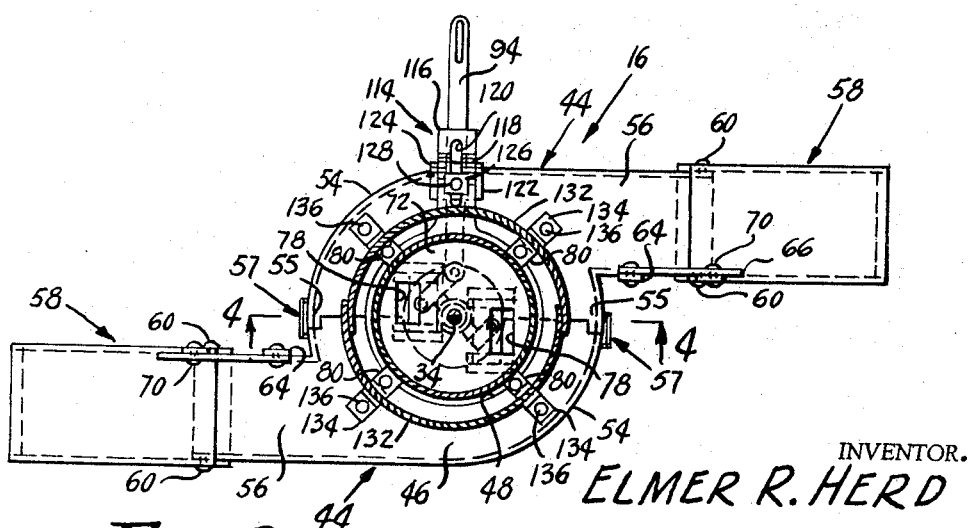
FIGURE 2 is a horizontal cross-sectional view of the spreader of FIGURE 1 taken substantially along line 2—2 thereof as viewed in the direction of the arrows.

Referring now to the drawings in detail, wherein like reference characters designate like elements throughout the several views thereof, and more particularly to FIGURE 1, there is indicated generally at 10 a broadcasting unit or material spreader having as its major components a hopper shown generally at 12, a supporting framework designated generally at 14 and a broadcaster denominated generally at 16 positioned to receive pulverant material from hopper 12 and constructed to discharge the received material on opposite sides thereof.

Inasmuch as hopper 12 and framework 14 are fully disclosed in the aforementioned application, reference is made thereto for a detailed explanation of the several elements that constitute these components. For present purposes, it is sufficient that hopper 12 includes an upper opening 18 so that pulverant material may be added thereto and a lower discharge orifice or spout 20 (FIGURE 4) having an outwardly extending circumferential flange 22 through which pulverant material flows to broadcaster 16. Similarly, it is sufficient that framework 14 provides means for supporting hopper 12 and broadcaster 16 while including connecting means shown generally at 26 for securing spreader 10 to a vehicle such that the material discharged from broadcaster 16 will be on lateral sides thereof as will be more fully explained hereinafter.

A major component of any broadcasting unit is a rotary disc designated generally at 28 in FIGURE 4 which includes a substantially flat plate 30 to which is secured a plurality of upwardly extending flanges 32. Disc 28 is fixedly mounted to a rotatable shaft 34 by a collar 36 and a transverse set screw 38 or the like. As will be more fully explained hereinafter, the upper end of shaft 34 extends through, and is mounted for rotation in, a closure plate shown generally at 24 and carries an agitator 40 (FIGURE 1) insuring the free flow of pulverant material through spout 20. The lower end of shaft 34 is rotatably driven by a conventional driving means shown generally at 42, the details of which are shown in the aforementioned application.

Another major component of broadcaster 16 is a disc housing comprised of a pair of identical segments shown generally at 44, which when joined together, form a circular top wall 46 having an enlarged central opening 48 and a circular bottom wall 50 having a smaller central opening 52. An arcuate side wall 54 joins top and bottom walls 46, 50 together about the circumference thereof with a pair of oppositely tangentially directed box-shaped chutes 56 providing a means of egress from the housing formed by segments 44. To assemble the disc housing, segments 44 are juxtaposed with extensions 55 aiding in alignment. After alignment, a conventional fastener shown generally at 57 may be used to secure segments 44 together.

An extension shown generally at 58, of complementary configuration to chute 56, is pivotally mounted by a pair of stub shafts 60 onto each of chutes 56 in material receiving relation therewith for diverting the substantially horizontal flow of material from chutes 56 in an upwardly inclined or downwardly inclined direction with respect to the ground to increase or decrease the distance travelled by the scattered pulverant material. An extension adjustment means shown generally at 62 is provided to control the angularity of extensions 58 and includes an upwardly extending L-shaped arm 64 on chute 56 forming a slot 66 extending laterally of material spreader 10. An upstanding arm 68 on extension 58 carries a pin 70 extending through slots 66 which may be secured therein by any conventional means, such as a wing nut or keeper. It will be seen that the selective positioning of pin 70 within slot 66 will control the angularity of extension 58.

Another important component of broadcaster 16 is closure plate 24 which includes a flat disc 72 forming a central bearing opening 74 receiving shaft 34 for rotation therein. Disc 72 also forms a circumferential upwardly extending flange 76 received about the lower end of spout 20 and forms a pair of discharge openings 78 between the closed wall forming discharge spout 20 and the center of disc 72.

Closure plate 24 is fixed relative to housing segments 44 by a plurality of L-shaped brackets 80 received over the top of flange 76 each of which is secured in place by a bolt or rivet 82. A plurality of protuberances 84 are affixed adjacent the circumference of central opening 48 of circular top wall 46 for placing closure plate 24 away from top wall 46 to allow the entrance of air into the interior of the disc housing to promote the distribution of pulverant material by disc 28. It should be apparent that housing segments 44 may be secured to hopper 12 or frame 14 in any suitable manner provided that closure plate 24 is snugly secured against the bottom of discharge spout 20, as by securement to flanges 22 or to framework 14.

A pair of guides 86 are secured adjacent each of discharge openings 78 by a plurality of frictional fasteners 88 and are spaced from plate 72 by inserts 87, as best seen in FIGURE 5, to receive a valve plate 90 for closing discharge openings 78. A linkage shown generally at 92 interconnects valve plates 90 and an operating rod 94 whereby an attendant may selectively open both of valve plates 90 simultaneously. Operating rod 94 may be further connected to a handle 96 (FIGURE 1) such that an attendant may control valve plates 90 when spreader 10 is mounted on a tractor or other suitable vehicle.

As may be seen in FIGURE 3, linkage 92 includes a master lever 98 journalled intermediate the ends thereof onto a boss 99, integral with plate 72, surrounding shaft 34 by a collar 100. Preventing separation of collar 100 and boss 99 are a plurality of large head screws 101 threaded into boss 99 and overlapping collar 100. A first slave lever 102 pivotally interconnects one of valve plates 90 with one end of master lever 98 with pivot pins 104 effecting the pivotal movement. It will be readily apparent that the rotation of master lever 98 in a clockwise direction, as may be seen in FIGURE 3, will result in the outward movement of valve plate 90 thereby closing off discharge opening 78. A second slave lever 106 pivotally interconnects the other end of master lever 98 with the other of valve plates 90 with a pair of pivot pins 108 effecting the connection. An extension 110 of second slave lever 106 is pivotally connected to the end of operating rod 94 by a suitable pin 112.

Referring now to FIGURES 2 and 3, a material flow control means shown generally at 114 positions rod 94, and consequently valve plates 90, to set the flow rate of the material through openings 78. Flow control 114 includes a tongue 116 integral with closure plate 24 and which forms a plurality of transversely extending ridges 118 which act as measuring indicia and a radially extending slot 120. An enlarged plate 122 resides between tongue 116 and lever 94 and carries a plug 124 interiorly of slot 120. A keeper 126 is positioned on the other side of tongue 116 with a screw 128 interconnecting keeper 126 and enlarged plate 122. Rod 94 carries a protuberance 127 that engage plate 122 and thereby limits the outward movement of rod 94 and consequently the size of the discharge aperture formed by openings 78 and valve plates 90. It will be seen that plate 122 may be adjusted with respect to tongue 116 to vary the flow rate of material passing the broadcaster 16.

When rod 94 is pulled outwardly as may be seen in FIGURE 3, extension 110 acts to rotate master lever 98 in a counterclockwise direction thus retracting both of valve plates 90 simultaneously. When operating rod 94 is pushed inwardly, master lever 98 is rotated in a clockwise direction thus moving both of valve plates 90 outwardly to close discharge openings 78 at the same time.

A sleeve shown generally at 130 is positioned about spout 20 to avoid the loss of pulverant material and includes a pair of generally semi-cylindrical walls 132 which may be secured to housing segments 48 to surround spout 20. Each of walls 132 carries a plurality of L-shaped brackets 134 which may be affixed to top wall 46 of segment 44 by a frictional fastener 136. As may be seen best in FIGURE 4, the upper edge of sleeve 130 is spaced slightly from hoper 12 and provides an air inlet which is sufficiently restricted in size to assure an inwardly flowing stream of air when disc 28 is being rotated.

When operating rod 94 is manipulated to uncover discharge openings 78, a flow of pulverant material from hopper 12 will result. The activation of driving means 42 will rotate shaft 34 and disc 28 to expel the pulverant material through chutes 56 and extensions 58. Referring now to FIGURE 3, it will be noted that discharge openings 78 are located immediately ahead of chutes 56 such that the impact of pulverant material onto rotary disc 28 will be effected immediately after a charge of material has been dispensed through chute 56. Stated in other terms, the rotation of rotary disc 28 is designated by the dashed arrow in FIGURE 3 such that material passing through discharge opening 78 will come in contact therewith as soon as the previous discharge chute has been passed.

It is now seen that there is herein provided an improved broadcasting unit having all of the objects of this invention and others, including many advantages of great practical utility and commercial importance.

Since many embodiments may be made of the instant inventive concept and since many modifications may be made in the embodiment hereinbefore shown and described, it is to be understood that the foregoing is to be interpreted merely as illustrative and not in a limiting sense.

I claim:

A spreader for distributing pulverant material comprising:

a hopper for receiving said pulverant material, said hopper having a depending discharge spout terminating in a discharge orifice adjacent the lower end thereof;

a closure plate covering said discharge orifice and fixed against movment relative to said spout, said closure plate having spaced apart openings extending transversely therethrough and in open communication at one of their respective ends with said discharge orifice;

a shaft journalled for rotation on said plate between said openings and having an end extending therebelow;

a rotary disc fixedly secured on said one end of said shaft for rotation therewith, said disc being positioned below said discharge openings to receive said pulverant material thereon and to scatter said pulverant material therefrom;

a housing enclosing said disc and means fixedly connecting said housing on said closure plate, said housing including a pair of vertically spaced top and bottom walls confronting, respectively, the opposed sides of said disc in vertically spaced relation relative thereto, said housing further including a side wall commonly connecting said top and bottom walls and circumscribing said disc in peripherally spaced relation relative thereto, said top wall being vertically spaced below said closure plate and having an opening extending transversely therethrough and through which said one end of said shaft extends and into said housing;

a pair of opposely directed chutes in open communication with said housing to receive said scattered pulverant material from said disc for diverting and discharging said pulverant material away from opposite sides of said hopper;

valve means disposed between said closure plate and said top wall and slidably connected on said closure plate for movement across and away from said openings to selectively open and close the latter;

and means to effect connection of said shaft with a power source.

References Cited

UNITED STATES PATENTS

| | | | |
|---|---|---|---|
| 2,626,729 | 1/1953 | Ajero | 222—485 X |
| 2,632,651 | 3/1953 | Rittenhouse | 222—485 X |
| 2,946,597 | 7/1960 | Simonsen | 275—8 |

ROBERT B. REEVES, *Primary Examiner.*

STANLEY H. TOLLBERG, *Examiner.*